United States Patent [19]

Trancik

[11] 3,769,071

[45] Oct. 30, 1973

[54] PRESSURE SENSITIVE ADHESIVE TAPE COMPRISING 5-FLUOROURACIL

[75] Inventor: Ronald J. Trancik, White Bear Lake, Minn.

[73] Assignee: Minnesota Mining and Manufacturing Company, St. Paul, Minn.

[22] Filed: June 4, 1971

[21] Appl. No.: 150,183

[52] U.S. Cl. .......... 117/122 P, 117/68.5, 117/76 A, 128/156
[51] Int. Cl. .............................................. C09j 7/02
[58] Field of Search ................... 117/122 P, 122 PF, 117/122 PB, 122 PA, 76 A, 68.5; 128/156

[56] References Cited
UNITED STATES PATENTS

| | | | |
|---|---|---|---|
| 3,249,109 | 5/1966 | Maeth et al. | 128/156 X |
| 2,064,898 | 12/1936 | Fetter | 117/122 |
| 2,018,517 | 10/1935 | Fetter | 117/122 |
| 1,555,960 | 10/1925 | Fuller | 117/122 |
| 2,241,384 | 5/1941 | Bateman et al. | 117/122 X |
| 2,802,005 | 8/1957 | Heidelberger | 260/251 X |
| 3,483,018 | 12/1969 | Waldman | 117/122 X |
| 3,214,501 | 10/1965 | Strauss | 128/156 X |
| 3,121,021 | 2/1964 | Copeland | 128/156 X |
| 2,925,174 | 2/1960 | Stow | 117/76 X |
| R24,906 | 12/1960 | Ulrich | 117/68.5 X |
| 3,285,245 | 11/1966 | Eldredge et al. | 128/156 |

FOREIGN PATENTS OR APPLICATIONS

| | | | |
|---|---|---|---|
| 1,075,939 | 7/1967 | Great Britain | 117/122 |
| 621,970 | 6/1961 | Canada | 117/122 |

Primary Examiner—William D. Martin
Assistant Examiner—Bernard D. Pianalto
Attorney—Kinney, Alexander, Sell, Steldt & Delahunt

[57] ABSTRACT

A pressure-sensitive adhesive tape is provided wherein 5-fluorouracil is incorporated in a compatible, preferably self-tackified polyurethane pressure-sensitive adhesive. The tape is useful for topical treatment of abnormal skin growths. The adhesive serves as a biologically and chemically inert carrier for the 5-fluorouracil.

1 Claim, No Drawings

PRESSURE SENSITIVE ADHESIVE TAPE COMPRISING 5-FLUOROURACIL

FIELD OF THE INVENTION

This invention relates to the use of pressure-sensitive adhesive tapes containing 5-fluorouracil blended with the adhesive portion of the tape. An aspect of this invention relates to a tape means for topical treatment of abnormal cutaneous growths. A further aspect of this invention relates to a composition suitable for coating a pressure-sensitive adhesive layer onto a backing wherein the resulting adhesive layer contains a pharmaceutically effective amount of 5-fluorouracil homogeneously distributed through this layer.

BACKGROUND OF THE INVENTION

The chemical compound 5-fluorouracil (2,6-dioxypyrimidine fluorinated at the 5- position) is a commercially available chemical and has been described in U.S. Pat. No. 2,802,005, issued Aug. 6, 1957. This chemical compound has been used for several years, both for the palliative treatment of internal cancers and for treatment of abnormal dermitological conditions and diseases, including intraepidermal carcinoma, keratocanthoma, mycosis fungoides, squamous cell carcinomata, nodular and superficial basal ceall carcinoma and, with particular effectiveness, for the treatment of actinic (solar) keratoses. See, for example, "Current Therapy 1969," edited by H. F. Conn, Saunders, Philadelphia, 1969, pages 584–587, 642–643, 594–595, and 540–543.

Dermatologic therapy using 5-fluorouracil is currently performed by applying the drug formulated as a cream, ointment or solution to the skin. Typically, solutions contain 2 or 5 percent 5-fluorouracil on a weight/weight basis, compounded with propylene glycol or mixtures of propylene glycol with other solvents, and suitable preservatives and similar additives. A typical cream formulation contains 5 percent 5-fluorouracil in a vanishing cream base comprising petrolatum, a fatty alcohol, propylene glycol alone or in combination with other solvents, and suitable emulsifiers and preservatives. Although these solutions and creams have been found to be effective against, for example, solar keratoses, there are several disadvantages to a topical treatment procedure using such creams and solutions. The treatment area is poorly defined, and some treatment is unnecessarily provided to normal skin, thereby increasing the risk to the patient of side effects caused by the drug. It is known that inflammation of adjacent normal skin is a possible side effect of 5-fluorouracil therapy. This can be a particular problem in the topical treatment of areas near the eyes, ears, nose and mouth. It is preferred not to apply 5-fluorouracil formulations to the skin with the fingers. Areas of normal skin should be washed immediately after contact with 5-fluorouracil formulations.

Previously available formulations of 5-fluorouracil are difficult to apply evenly, resulting in uneven dosage. Some areas which are treated receive excess drug, while other areas receive insufficient drug. Uneven dosage is a therapeutic hazard, particularly since the diseases treated are cancerous or potentially cancerous, and prompt, effective treatment is required.

Phototoxicity is known to be a potential hazard using topical formulations due to interaction of the ultraviolet component of any light source with the drug.

Creams, ointments and liquid formulations are impractical or uncomfortable under or near clothing. They may be transferred readily whether by scratching, rubbing and the like, or unintentionally. They may also be cosmetically undesirable.

In an effort to solve some of these problems, dressings over 5-fluorouracil formulations have previously been used. Such dressings simplify the treatment of disease around and under clothing and head-coverings somewhat, although they tend to be excessively bulky. A potential advantage of dressings is improved percutaneous absorption of the drug, hence reduced dosages; see, for example, Ann. Rev. Med., 21, pp. 59–66 (1970). It is believed that these reduced dosages can reduce the risk of side effects. There are, however, two principal disadvantages of dressings: First, most skin conditions requiring 5-fluorouracil therapy are in exposed portions of the body, and particularly on the face, neck and hands. Available dressings are cumbersome and inconvenient and cosmetically undisguisable. The cosmetic liabilities of such dressings are readily observed. Second, dressings can be difficult to apply and require sequentially, application of the drug, application of the dressing, and fastening of the dressing.

The disadvantages of bulky dressings could possibly be obviated through the use of pressure-sensitive tapes containing medicaments on or in the adhesive layer. The medical literature with regard to medicated tapes is extensive, a representative example of such literature being an article by Halprin et al, Arch, Derm., 100, pages 336–341 (Sept., 1969), which describes the use of an anti-inflammatory steroid in a medicated pressure-sensitive adhesive tape. Nowhere in this vast medical literature relating to such medicated tapes is there any disclosure of an attempt to include a fluorinated, monocyclic anti-neoplastic compound of the nature of 5-fluorouracil in the adhesive layer of a tape. Although the advantages of a medicated pressure-sensitive adhesive tape containing 5-fluorouracil would be numerous, the problems and variables to be resolved in order to obtain a 5-fluorouracil tape are complex and formidable. Typically, the medicaments used in prior art tapes, e.g. steroids and salicylates, have solubilizing substituents or side-chains and are compatible with a wide range of materials, many of which have been shown to be substantially safe biologically and non-reactive with the medicament. However, 5-fluorouracil is a 6-member fluorinated heterocycle having, at best, fairly low solubility or compatibility in most carriers. A few suitable low molecular weight liquid carriers and solvents for this compound have been found, e.g. propylene glycol, and a few more or less adequate cream or ointment bases have been compounded. The compatibility and reactivity of the compound with elastomeric materials and compositions such as pressure-sensitive adhesives (hereinafter referred to as PSA's) or coatable compositions containing PSA's is apparently still untested. The theory relating to topical therapy implies that incompatibility of the compound with its carrier can adversely affect the capability for uniform dosage.

Accordingly, this invention contemplates providing a pressure-sensitive adhesive (PSA) tape in which 5-fluorouracil is incorporated in the adhesive layer. This invention further contemplates an occlusive PSA tape containing 5-fluorouracil, which tape permits deep penetration of cutaneous malignancies by the 5-fluorouracil, precise control of the treatment area, and reduced side effects, particularly reduced inflammation of adjacent normal skin. This invention contemplates a 5-fluorouracil PSA tape which can be cut, shaped, and trimmed exactly to fit the area to be treated and which can apply the dosage evenly (homogeneously) without difficulty, although uneven but controled dosage of the drug can also be provided, if desired, by adjoining tapes with two or more concentrations of the drug. It is further contemplated that inflammatory reactions and/or phototoxicity can be reduced by varying the opacity of the tape backing and the PSA itself, providing an effective screen for ultraviolet light. Further advantages of the tape of this invention are their minimal bulk, protection from scratching or accidental rubbing by hands or clothing of the diseased area, improved appearance over bulky dressings, and generally increased simplicity and convenience for a course of topical treatment.

SUMMARY OF THE INVENTION

The 5-fluorouracil tapes of the present invention are provided by formulating a relatively low viscosity coatable composition containing a suitable PSA, a suitable liquid vehicle or carrier, and a suitable amount of 5-fluorouracil, blending the coatable composition until it is homogeneous, coating the composition onto a suitable tape backing or release liner, and permitting the liquid carrier to evaporate, leaving a coating comprising a tacky, readily deformable, amorphous, substantially solvent-free, solid or semi-solid, pressure-sensitive adhesive (PSA) layer carrying 5-fluorouracil in a pharmaceutically effective concentration, preferably up to 5 percent by weight, and preferably homogeneously distributed throughout this layer. By "homogeneous" it is meant that the drug is distributed throughout the PSA substantially in the manner that a solute is homogeneously distributed in a solution or other single phase system. Thus the PSA acts as a readily deformable, solid or semi-solid carrier for the drug. It is preferred that the PSA be self-tackified and sufficiently heat- and light-stable to avoid the need for tackifier and stabilizer additives to the adhesive composition. That is, the unmedicated PSA composition preferably consists solely or primarily of an inherently rubbery and tacky polymer which is compatible with 5-fluorouracil and tacky to and biologically compatible with skin. It has been found that inherently rubbery and tacky acrylate-type and polyurethane-type adhesives which form films which have a 100 percent modulus of less than 100 psi (7 kg/cm$^2$), preferably less than 70 psi (5 kg/cm$^2$) are particularly suitable for use in this invention. In any event, to be suitable for use in this invention, a PSA must meet the criteria described herein.

DETAILED DESCRIPTION OF THE INVENTION

There is, apparently, no published data relating to the compatibility of 5-fluorouracil with elastomeric or rubbery compositions. Since it is difficult to dissolve 5-fluorouracil in many of the carriers commonly used in pharmaceutical practice, and since even these carriers are low molecular weight liquid solvents, the compatibility of the drug with solid or semi-solid elastomer-containing PSA's must be determined by experiment. Compatibility data should also be experimentally determined for flowable PSA-containing compositions which can be utilized in standard tape coating equipment. Further, experimentation is involved to consider the possibility of side reactions or effects from or between PSA components or solvents and 5-fluorouracil, between 5-fluorouracil solvent, and PSA's, and from any or all of these materials and biological environments (e.g. skin). Surprisingly, this invention establishes that standard concentration levels (up to 5 percent by weight) of 5-fluorouracil can be brought into a compatible (hence therapeutically highly effective) association with PSA's. The method of achieving this operable association is described subsequently.

The preferred form of operable association is the "homogeneous" type of distribution, defined previously. "Homogeneous" (solution-type) distribution of 5-fluorouracil has been achieved in inherently rubbery and tacky polymers which are chemically stable to aging, air oxidation, heat and light, non-reactive with the drug and with the tape components (backing, backsize, liner, etc.), and biologically compatible (e.g. with skin). That is, substantially one-component, highly stable PSA's have been found to be compatible with the drug. This permits the skilled clinician to utilize a tape coated with a storage stable, biologically acceptable single phase topical treatment composition containing only two components: the drug and its inherently tacky, easily-deformable, solvent-free, solid or semi-solid carrier. This carrier/drug medicated PSA system and its associated tape backing can combine the advantages of the prior art ointments, creams, or solutions with the advantages of a medicated tape.

The advantages of the tape systems of this invention have been touched upon previously. Two particularly important advantages, dosage control and the variable properties of the backing, will now be discussed in detail.

It is well known in the medical art that accurate knowledge of the drug dosage utilized to treat an ailment is important, and may be the difference between success and failure. No previously available topical 5-fluorouracil dosage form can provide such dosage control. The preferred "homogeneous" form (as defined herein) of this invention can maximize this advantage. Thus, the standard concentration levels of 5-fluorouracil (e.g. 1, 2 and 5 wt. %) are fully operative in this invention. Crystallization of the drug in adhesives has been found to be a common occurrence. Although these crystals are generally small and detected by a microscope rather than the naked eye, it is preferred to have the drug present homogeneously, i.e. substantially as a solute is homogeneously present in a solution.

A second advantage of the tape systems of this invention is that tape backings of various porosities, gas permeability, moisture transmissivity, etc., are known in the art. See U.S. Pat. No. 3,214,501 (Strauss), issued Oct. 26, 1965, U.S. Pat. No. 3,285,245 (Eldredge et al.), issued Nov., 1966, and U.S. Pat. No. 3,121,021 (Copeland), issued Feb., 1964. The variability of the properties of the backing provides advantages for the clinician and the patient which are more difficult to obtain or control by other means, e.g. dressings and creams.

The operable association of the 5-fluorouracil and a PSA of a tape of this invention has been achieved through the use of suitable liquid dissolving or dispersing media for the PSA, which media are capable of at least partially dissolving 5-fluorouracil. This operable association is preferably of the previously described "homogeneous" type.

A preferred method to distribute the drug through a PSA homogeneously is to dissolve the drug in a solvent, then mix the drug solution with the PSA. Alternatively, the 5-fluorouracil can be added as a dry solid to the PSA when the PSA is dissolved or dispersed in a liquid carrier which will also dissolve the 5-fluorouracil. Still another method is to disperse the 5-fluorouracil in a liquid carrier and add the dispersion to a dispersion or solution of the PSA in a liquid carrier which is a better solvent for the drug. (It is preferred for biological compatibility that the PSA be, after coating onto the tape backing, not only solvent free but also free of reactive organic substituents or the like, e.g. unreacted —NCO groups. It is possible to add particles or a solution of 5-fluorouracil to the surface of a PSA coating, but this procedure is not preferred.

It is difficult to select suitable liquid vehicles in these methods because of the well-known poor solubility of 5-fluorouracil in most solvents. This limitation is further complicated by the requirement that the solvent be suitable for use with all of the tape components. This requirement of suitability applies to each of the PSA, liner, backsize, and backing. Each PSA system has its own requirements as to solvents or carriers; for example, in some cases a solvent may cause the drug-PSA mixture or PSA to gell.

The preferred liquid vehicles used in preparing the tape coating compositions of this invention are solvents such as methanol, acetone, n-propylamine, water, dimethyl sulfoxide, toluene, propylene glycol, acetic acid, dimethyl formamide and the like, or mixtures of such solvents. Of these, dimethyl formamide and combinations of water, propylene glycol and acetic acid appear to be particularly suitable for use in this invention.

The inherently and normally tacky polyurethane-type polymer which can be used as the PSA in tapes of this invention are solid polyurethane, polyurethane-polyurea, or polyureapolymers containing at least 20% by weight pendant chains. These polymers are derived from prepolymers having a high functionality (at least 2.5) capped with at least 0.5 equivalent of a monofunctional capping agent, a high weight % of oxyalkylene units, a low weight % of aromatic nuclei, and little or no crosslinking, preferably less than one crosslink per 8,000 theoretical atomic mass units of polymer. The prepolymers are chain extended with water, diols or the like (preferably water) to provide a film-forming, normally and inherently tacky polymer with a 100 percent modulus of, preferably, less than about 70 p.s.i. (5 kg/cm$^2$). The chain-extended polymers preferably contain hydrophilic groups in the polymer chain, e.g. protonated tertiary nitrogens and are thus self-emulsifying. The polymers are preferably provided for use in this invention as aqueous latices or dispersions in organic liquid carriers such as acetone. The aforementioned pendent chains have about 600 to about 4000 atomic mass units.

The polyurethane-type polymers which are most preferred for use in this invention prepared from prepolymers which in turn are initially prepared from (1) a poly(oxyalkylene) triol or mixtures of this triol with a tetrol, and (2) an aromatic or aralkylene diisocyanate such as tolylene diisocyanate, xylylene diisocyanate, naphthylene diisocyanate, 4,4'-diphenylmethane diisocyanate, or the like, in an NCO/OH ratio of about 1.8 to 2.0:1. The preferred triols are the poly(oxypropylene) triols having a hydroxide equivalent weight ranging from about 500 to about 2,000; the preferred tetrols have the formula

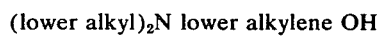

where $n{:}m$ normally ranges from 5:95 to 95:5, but preferably is about 9:1, and $n+m$ is a number large enough to provide a hydroxide equivalent weight in the range of about 500 to about 2,000. The preferred diisocyanate is tolylene diisocyanate, preferably the 2,4- and/or 2,6-isomer. After the initial prepolymer has been prepared, it is end capped with a capping agent preferably diluted with dry toluene. Suitable capping agents include the primary and secondary lower alkanols (n-butyl alcohol, i-propyl alcohol, n-butyl alcohol, etc.) and/or a compound of the formula (lower alkyl)$_2$N lower alkylene OH such as diethylethanolamine, diisopropylethanolamine, or the like. The capping reaction provides at least 20 weight % pendent chains as described previously, and reduces the isocyanate functionality of the prepolymer from about 3 to 4 down to about 2. The partially end-capped prepolymer, as a solventless, viscous liquid or slightly diluted with a solvent, is added to a dilute aqueous solution of acetic acid and stirred with a conventional high speed, high shear mixer to simultaneous chain-extend and emulsify the prepolymer. After chain extension is complete and entrapped carbon dioxide has escaped, a stable latex with a bluish cast is obtained. The latex is thickened, if necessary, to make it suitable for coating onto a tape backing or release liner with conventional tape coating apparatus. Prior to coating, the 5-fluorouracil can be added to the latex as described previously, preferably dissolved or dispersed in a liquid carrier. The ultimate result is a two-component coating, i.e. a homogeneous (solution-type) distribution of the drug in the polyurethane solids of the PSA layer.

Other suitable adhesives are copolymers of a major amount of an acrylate ester and a minor amount of acrylic acid. Suitable acrylate esters include isoamyl acrylate, the acrylate ester of commercial fusel oil, 2-ethylbutyl acrylate, ethyl acrylate, isooctyl acrylate and the like as set forth in U. S. Pat. No. Re. 24,906 (Ulrich), issued Dec., 1960, cf. Stow, U.S. Pat. No. 2,925,174, issued Feb. 1960. As also taught in that patent, acrylic acid, methacrylic acid, itaconic acid, acrylamide and methacrylamide can be used as comonomers with the acrylate ester. The ratio of acrylic ester to acrylic acid, or its equivalent, can be in the range of 92–96:8–4.

The concentration of the adhesive-drug-solvent mixture can be varied. Up to 50 percent (by weight of adhesive formulation) solvent has been used, but generally the solvent concentration is less than 30 percent. In order to be coatable, viscosity of the adhesive-drug-solvent is the limiting factor. The homogeneous drug concentrations routinely used are 1,2 and 5 percent, but lower concentrations such as 0.10 percent are easily achieved, and higher concentrations can be obtained if crystals are allowed, e.g. up to 10 percent by weight. Experimental evidence indicates that the adhesives of this invention do not interact chemically with these concentrations of 5-fluorouracil at normal ambient conditions of temperature, humidity pressure, etc., and even at temperatures up to 60° C.

A concentration of 1 percent by weight of drug in adhesive-solvent mixture gives a concentration of about 45 μg/cm$^2$ at a coating weight of about 11.0 grains/24 in.$^2$ (about 4.5 mg/cm$^2$). The tapes of the invention can be stored in rolls, with or without a liner.

Suitable backings for the tapes of the present invention include films and webs which can be non-porous, or, as is disclosed in the aforementioned U.S. Pat. No. 3,214,501, microporous and/or macroporous. The backing can comprise ethylene-vinyl acetate copolymer, polyethylene, polypropylene, or polyurethane films or films of randomly oriented rayon fibers.

The "100% modulus" property of the rubbery, tacky polymers of this invention is determined with a constant rate of extension tensile tester (e.g. an "Instron") at 25° C., about 50% relative humidity, and an extension rate of 50.8 cm/sec. (20 in./min.).

The following examples are provided to illustrate the invention by specific embodiments as described hereinabove, but are not intended to limit the invention.

EXAMPLE 1

Skin Sensitivity Tests on Adhesives
A. Polyurethane Adhesive(all parts are by weight).

The following starting materials were reacted: 2150 parts of poly(oxypropylene) triol, equivalent weight 897; 1443 parts of poly)oxypropylene/oxyethylene) tetrol from 90/10 propylene oxide/ethylene oxide extension of ethylene diamine, equivalent weight 902; and 660 parts of tolylene diisocyanate (an 80/20 mixture by weight of the 2,4/2,6-isomers), thus providing an NCO/OH ratio of 1.9:1. The resulting NCO/polyol reaction provided an NCO-terminated prepolymer having pendant chains terminated with free-isocyanate radicals. This prepolymer was then reacted with 206.5 parts of diethylethanolamine diluted with an equal amount (by weight) of toluene. The amount of diethylethanolamine used in this second step of the preparation was 110 percent of the moles of mono-ol needed to cap the isocyanate-terminated pendent chains. The resulting prepolymer having pendent chains endcapped with diethylethanolamine, and still hot from the end-capping reaction, was added with vigorous agitation to a solution of 10.5 parts of acetic acid in 7700 parts of water. The resulting emulsion was stirred to remove entrapped carbon dioxide and left to stand for more than 24 hours to completely cure. The resulting latex, brought to a suitably high viscosity, was coated onto a silicone release paper with a supported knife applicator and the water phase of the latex was removed by air drying. A normally tacky, pressure-sensitive adhesive coating was obtained. A polyethylene film was laminated onto the adhesive, the silicone release paper being retained as a liner. The laminate was cut into patches for use in a standard dermatological patch test procedure. Upon removing the silicone liners and placing the polyurethane adhesive layer in contact with human skin in the patch test, no irritation or sensitization of human skin to the polyurethane adhesive was observed.

B. Isooctyl Acrylate/Acrylic Acid Copolymer Adhesive

An isooctyl acrylate/acrylic acid copolymer in the ratio of 95/5 acrylate to acrylic acid was prepared according to Ulrich, U.S. Pat. No. Re. 24,906. The adhesive coating composition made up from the adhesive contained 53 grams of solids and weighed a total of 227 grams. This coating composition was coated onto a silicone release paper with a supported knife over roller applicator, and the solvent was removed by air drying for four hours, followed by lamination with a polyethylene film. The resulting tape was cut into patches and tested as in Example 1(A). As in the tests reported in the aforementioned U. S. Patent 3,121,021, no significant irritation or sensitization of human skin to the adhesive was observed.

EXAMPLE 2

A sample of 0.6 g. of 5-fluorouracil is dissolved in dimethyl formamide (6 ml) and the solution is washed, with 2 ml of dimethyl formamide into 190 g. (32% solids) of the polyurethane latex adhesive of Example 1(A), then mixed thoroughly. The resulting medicated PSA system containing the drug was coated onto a silicone release paper with a supported knife applicator and the liquid phase removed by air-drying. A polyethylene film was laminated onto the adhesive and the silicone release paper retained as a liner as in Example 1(A). The laminate was cut and stored in sheets. The adhesive was present in an amount of 11.0 ± 1.0 grains per 24 in.$^2$ (4.5 mg/cm$^2$) and 5-fluorouracil was present in the adhesive layer in a concentration of about one percent by weight (about 45 μg/cm$^2$). Upon microscopic examination, no crystals were observed. This tape was found to be stable at 60° C. for greater than 336 hours, and no chemical interaction between the 5-fluorouracil and the tape components was evidenced by changes in physical properties such as color, viscosity, odor and the like or changes in drug concentration according to spectrophotometric analysis.

EXAMPLE 3

In a similar manner to Example 2, a 5-fluorouracil tape was prepared wherein the backing applied was a microporous polypropylene film laminated onto the adhesive. The tape was stable indefinitely to ambient conditions. The tape components and the drug were not observed to interact chemically.

EXAMPLE 4

In a similar manner to Example 2, 5-fluorouracil tape was prepared wherein the backing applied was a microporous copolymer (90:10) of ethylene-vinyl acetate. The tape was stable indefinitely to ambient conditions. The tape components and drug were not observed to interact chemically.

EXAMPLE 5

In a similar manner to Example 2, 5-fluorouracil tape was prepared wherein the backing applied is a microporous polyurethane. The tape is stable indefinitely to ambient conditions. The tape components and the 5-fluorouracil were not observed to interact chemically.

EXAMPLE 6

A sample of 0.06 g. of 5-fluorouracil was mixed with water (2.0 ml) and acetic acid (15 drops) and the solution was mixed thoroughly with 10 g. (32% solids) of the polyurethane PSA coating composition of Example 1(A). The medicated PSA system was coated onto a silicone release paper with a supported knife applicator and the liquid phase removed by air-drying for four hours. A polyethylene film was laminated onto the adhesive, the silicone release paper being retained as a liner. The adhesive was present in an amount of 11.0±

1.0 grains per 24 in.$^2$ and 5-fluorouracil was present in the adhesive layer in a concentration of about two percent by weight (about 90 $\mu$g/cm$^2$). Upon microscopic examination, no 5-fluorouracil crystals were detected at 20, 48, or 144 hours. At 648 hours tiny crystals were observed microscopically. The tape components and the 5-fluorouracil were not observed to interact chemically.

EXAMPLE 7

A sample of 0.06 g. of 5-fluorouracil was mixed with propylene glycol (2 ml.) and acetic acid (2 drops) and the solution was mixed thoroughly with 10 g (32% solids) of the polyurethane adhesive coating composition of Example 1(A).

The resulting medicated PSA solution was coated onto a silicone release paper with a supported knife over roller applicator and the liquid phase removed by air-drying for two hours and treating with a cold air gun for two hours. A polyethylene film was laminated onto the adhesive, and the silicone release paper was retained as a liner. The adhesive was present in an amount of 11.0 ± 1.0 grains per 24 in.$^2$ and 5-fluorouracil was present in the adhesive layer in a concentration of two percent by weight (about 90 $\mu$g./cm$^2$). Upon microscopic examination, no 5-fluorouracil crystals were detected at 20, 48, 144, or 648 hours. No chemical interaction between the tape components and the 5-fluorouracil was detected.

EXAMPLE 8

A sample of 5-fluorouracil (0.55 g.) was dissolved in dimethyl formamide (35 ml.) and the solution mixed thoroughly for one day with a coatable adhesive (227 g. wet, 53 g. total dry) using an additional 5 ml. of dimethyl formamide to wash the solution into the PSA coating composition. The acrylate adhesive of Example 1(B) was used.

The adhesive solution was coated onto a silicone-release paper with a supported knife over roller applicator and the solvent was removed by air-drying for four hours, followed by lamination with polyethylene film.

The tape was found to be stable at 60° C. for 336 hours. The tape was found to be stable to ultraviolet light by exposing a 50 cm$^2$ strip for 90 hours to both a floodlamp and ultraviolet light of wavelength 253.7 millimicrons. No chemical interaction between the tape components and the 5-fluorouracil was observed.

EXAMPLE 9

A sample of 0.60 g. of 5-fluorouracil was dissolved in dimethyl formamide (6 ml.) and the solution was washed with 2 ml. of dimethyl formamide, into 180 g. (32 percent solids) of the polyurethane adhesive system of Example 1(A) and then mixed thoroughly.

The resulting medicated adhesive coating composition was coated onto a silicone release paper with a supported knife applicator and the liquid phase removed by air-drying.

A film of randomly oriented rayon fibers was laminated onto the adhesive. The silicone release paper was retained as a liner. The adhesive was present in an amount of 19.4 grains per 24 in.$^2$ (8.1 mg/cm$^2$) and 5-fluorouracil was present in the adhesive layer in a concentration of about one percent by weight (about 81 $\mu$g/cm$^2$). No chemical interaction between the tape components and the 5-fluorouracil was observed.

What is claimed is:

1. A pressure-sensitive adhesive tape comprising a backing and a pressure-sensitive adhesive layer bonded thereto, said pressure-sensitive adhesive layer comprising:

an inherently rubbery and normally tacky polymer which is substantially non-reactive to 5-fluorouracil at ambient temperatures up to 60°C. and has a 100 percent modulus of less than 70 p.s.i. and which is a polyurethane having at least 20 weight % pendant chains, and 0.1–5% by weight of 5-fluorouracil homogeneously distributed throughout said inherently rubbery and normally tacky polymer.

* * * * *